United States Patent [19]

Snow

[11] Patent Number: 5,221,142
[45] Date of Patent: Jun. 22, 1993

[54] METHOD AND APPARATUS FOR TEMPERATURE MEASUREMENT USING THERMAL EXPANSION

[75] Inventor: Kenneth A. Snow, San Juan Bautista, Calif.

[73] Assignee: Peak Systems, Inc., Fremont, Calif.

[21] Appl. No.: 702,991

[22] Filed: May 20, 1991

[51] Int. Cl.⁵ .................. G01K 5/50; G01B 11/02
[52] U.S. Cl. .................. 374/120; 374/55; 356/357
[58] Field of Search ............ 374/6, 13, 45, 55, 129, 374/120, 130, 142, 161, 188, 187; 356/355, 127, 356, 357, 358

[56] References Cited

U.S. PATENT DOCUMENTS

| | | | |
|---|---|---|---|
| 2,573,686 | 11/1951 | Blinn et al. | 374/205 |
| 4,253,304 | 3/1981 | Lamb et al. | 374/187 X |
| 4,381,152 | 4/1983 | Riech et al. | 374/55 X |
| 4,534,645 | 8/1985 | Nohda | 356/127 X |
| 4,604,572 | 8/1986 | Horiuchi et al. | 374/45 X |
| 4,636,088 | 1/1987 | Rosenewaig et al. | 356/357 X |
| 4,636,969 | 1/1987 | Kyoden et al. | |
| 4,671,651 | 6/1987 | Toyoda et al. | |
| 4,764,026 | 8/1988 | Powell et al. | |
| 4,823,291 | 4/1989 | Berman | |
| 4,854,731 | 8/1989 | Jenkins | |
| 4,890,245 | 12/1989 | Yomoto et al. | |
| 4,919,542 | 4/1990 | Nulman et al. | |
| 4,924,477 | 5/1990 | Gilmore et al. | |
| 4,964,726 | 10/1990 | Kleinknecht et al. | 356/355 X |
| 4,969,748 | 11/1990 | Crowley et al. | 374/129 X |
| 4,979,133 | 12/1990 | Arima et al. | |
| 4,979,134 | 12/1990 | Arima et al. | |
| 4,989,980 | 2/1991 | Berg | |

OTHER PUBLICATIONS

Tech Notes and Product Literature of Orton, Edward Orton Jr. Ceramic Foundation, Westerville, Ohio, USA.

"Rapid thermal processing systems: A review with emphasis on temperature control", Fred Roozeboom, J. Vac. Sci. Technol. B 8 (6), Nov./Dec. 1990.

Primary Examiner—William A. Cuchlinski, Jr.
Assistant Examiner—G. Bradley Bennett
Attorney, Agent, or Firm—Townsend and Townsend Khourie and Crew

[57] ABSTRACT

An apparatus and method for determining the temperature of an object, such as a semiconductor wafer by measuring the physical change in a dimension of the semiconductor wafer is disclosed. This physical change is then correlated to the temperature using the coefficient of thermal expansion for the wafer.

3 Claims, 3 Drawing Sheets

METHOD AND APPARATUS FOR TEMPERATURE MEASUREMENT USING THERMAL EXPANSION

BACKGROUND

The present invention relates to methods and apparatus for measuring the temperature of an object, in particular a semiconductor wafer during processing.

During the processing of a semiconductor wafer, it is required that the wafer be subjected to certain temperatures for different process steps. Although the temperature inside the oven might be known, the temperature of the wafer itself is the parameter that is critical. One method is to physically connect a thermocouple to the wafer to measure its temperature. However, a good connection is difficult to make unless the thermocouple is embedded in the wafer, which will make that portion of the wafer unusable.

One method, disclosed in U.S. Pat. No. 4,984,902, uses a pyrometer to measure the infrared emissivity of the wafer during heating. When the wafer is heated, it will emit an amount of infrared radiation of a particular wavelength band which can be detected by a pyrometer and correlated to the temperature of the wafer. This requires a calibration process in which a sample wafer of the batch to be processed has a thermocouple embedded in it so that the apparatus can be calibrated for the emissivity of that type of a wafer. Once calibrated, a run of wafers can be done without using an embedded thermocouple, relying solely on the emissions detected by the pyrometer. Unfortunately, the need to embed a thermocouple causes delays in the assessment of the wafers. Furthermore, inaccuracies in measurements can arise due to small variations in the emissive properties of the wafers. It is therefore desirable to have a method for measuring the actual temperature of the wafer without embedding a thermocouple and without dependence on the wafer's emissive properties.

SUMMARY OF THE INVENTION

The present invention provides an apparatus and method for determining the temperature of an object, such as a semiconductor wafer by measuring the physical change in a dimension of the semiconductor wafer. This physical change is then correlated to the temperature using the coefficient of thermal expansion for the wafer.

This invention thus uses the coefficient of thermal expansion in an unusual way. Typically, the coefficient is used when the temperature is known and one wants to determine how much a part (such as a piece of a car engine) will expand. Here, the expansion is measured to determine the temperature.

Preferably, the change in the diameter of a wafer is measured using an optical auto-focus mechanism. Alternately, mechanical, electromagnetic or other methods for measuring the change in dimension could be used. In order to compensate for vibrations or movements of the wafer, the wafer is either biased against a fixed reference point or multiple auto-focusing mechanisms or their equivalents are used to determine the absolute location of various points on the wafer. The relative change between these points on the wafer can then be determined to eliminate the effects of vibration.

Preferably, the auto-focus mechanism uses a chopper wheel which rotates through a beam reflected off an edge of the wafer. A pair of photodetectors detect the beam as chopped by the chopper wheel. The phase difference between the alternating signals produced by the photodetectors indicates which direction the chopper wheel or focusing assembly needs to be moved in order to position the chopper wheel at the focus point. By monitoring the position of the focusing assembly, the location of the focus point and thus the location of the edge of the wafer can be determined.

For a more complete understanding of the nature and advantages of the invention, reference should be made to the ensuing detailed description taken in conjunction with the accompanying drawings.

DETAILED DESCRIPTION OF THE PREFERRED EMBODIMENTS

Figure 1:
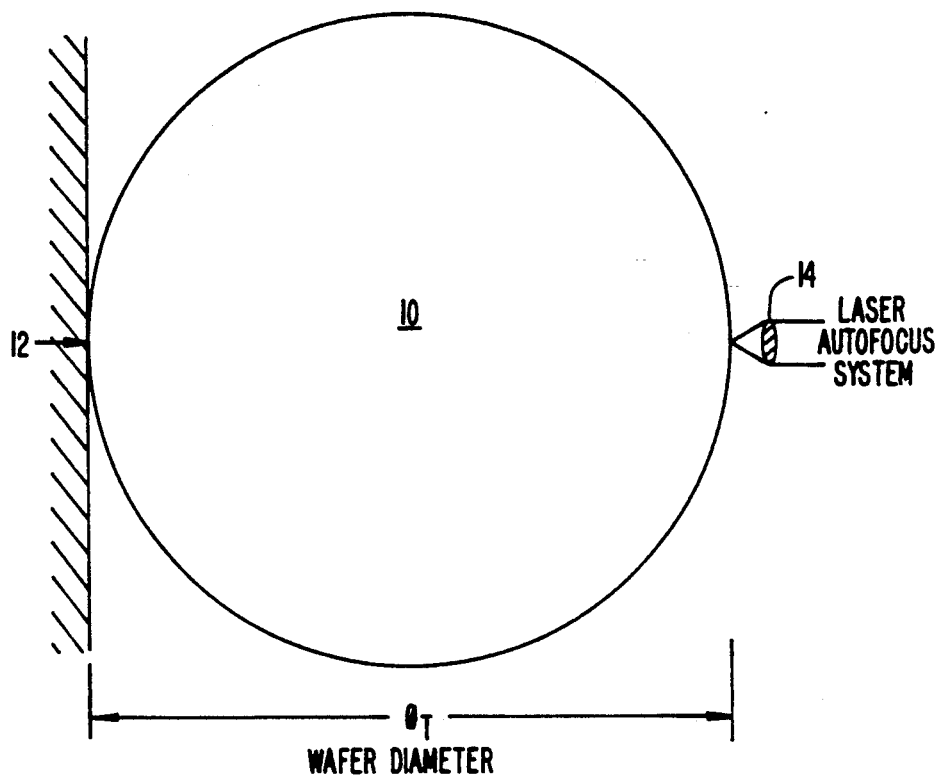
FIG. 1 is a diagram of a wafer and auto-focus system according to the present invention.

FIG. 1 shows a silicon wafer 10 which is butted up against a fixed reference 12. As it is heated, wafer 10 will expand, increasing its diameter. A laser autofocus system 14 focuses a light beam on the edge of the wafer. By measuring the movement required in the autofocus system to maintain focus, the change in the diameter of the wafer can be monitored.

Since semiconductor wafers are primarily made of silicon, the coefficient of thermal expansion for silicon can be used to derive the temperature for a given change in wafer diameter.

The coefficient of thermal expansion of silicon $\alpha(T)$ at $1000° C. = 4.5 \times 10^{-6°} C.^{-1}$. The coefficient varies slightly at different temperatures, and this is compensated for in software.

The wafer diameter $\phi_{20}$ at room temperature $$(20° C.) = 200 MM.$$

The wafer diameter increase is calculated as follows (for a temperature increase of 1000° C.):

$$\phi_T - \phi_{20} = [\phi_{20}][\alpha(T)][T]$$

$$\phi_{1000} - \phi_{20} = (200MM)(4.5 \times 10^{-6°} C.^{-1})(1000° C.)$$

$$\phi_{1000} - \phi_{20} = (2 \times 10^5 \mu)(4.6 \times 10^{-6°} C.^{-1})(1 \times 10^{3°} C.)$$

$$\phi_{1000} - \phi_{20} = 900\mu$$

If a laser auto-focus system or some other edge-sensing technique is used, the temperature of the wafer can be calculated by measuring the change in edge position of the wafer as the temperature increases and solving the above equation for T using the measured value for $\phi_T - \phi_{20}$.

The sensitivity of the technique for a 1° C. change in temperature is:

$$\phi_{21} - \phi_{20} = (2 \times 10^5 \mu)(4.5 \times 10^{-6} \text{ C.}^{-1})(1° \text{ C.})$$

$$\phi_{21} - \phi_{20} = 0.9 \mu$$

Since the laser auto-focus can sense edge position changes as small as 0.03μ, the technique should easily detect 1° C. temperature differences.

Two factors that affect the practical implementation of the concept are vibration and wafer bowing as the wafer is heated.

Figure 2:
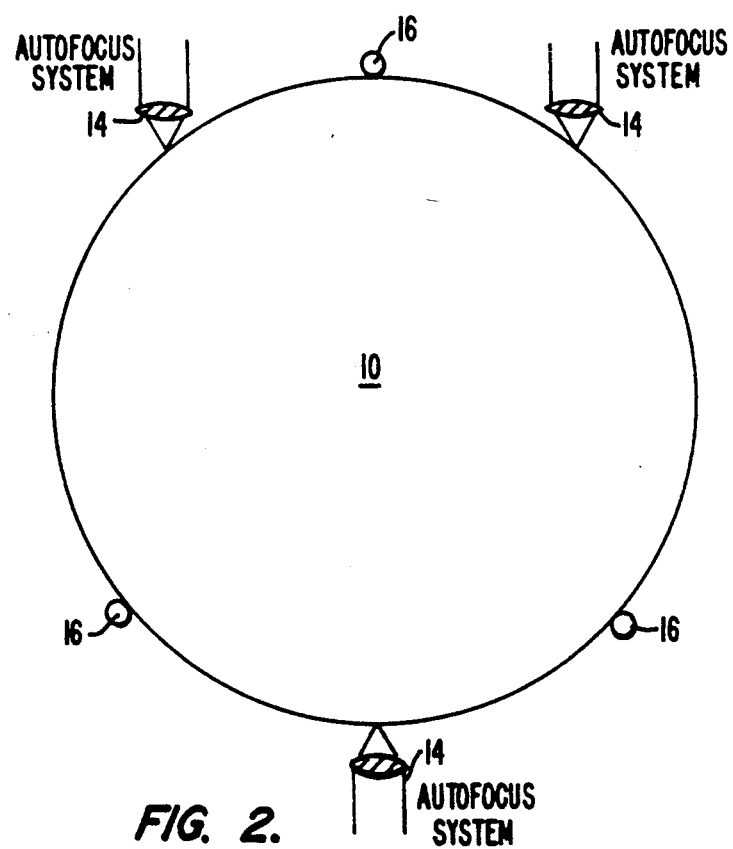
FIG. 2 is an alternate embodiment of the system of FIG. 1 showing multiple auto-focus systems to compensate for vibrations.

The vibration issues can be addressed by using three auto-focus systems 14, as depicted in FIG. 2, and processing the information from them to obtain the diameter change independent of the random lateral vibrations taking place.

Bowing can occur during heating of the wafers since the top part of the wafer is typically doped differently than the bottom portion, causing a difference in the thermal expansion rates. This should not be a problem at a set elevated temperature since the temperatures will even out, but can have an effect on attempts to measure rapid changes in temperature. This will result in the temperature reading being slightly lower than it actually is during rapid heating. This effect is taken into account by presenting the temperature to the operator with fewer digits of accuracy during rapid heating, with full accuracy used when the temperature has had time to settle.

As shown in FIG. 2, three different pins 16 could be used to hold wafer 10 in place. One of the pins could be spring-loaded to avoid the effects of vibration and eliminate the need for two of the auto-focus systems. Alternately, for increased accuracy, the three auto-focus systems could be used in conjunction with the multiple pin holding system.

Measurement systems other than an auto-focus could be used to determine the change in wafer diameter. For example, a spring-loaded arm could be biased against the side of the wafer, with the physical distance the arm is moved being measured either electromagnetically, or by measuring the shadow it produces on a photodetector, or otherwise. Alternately, a light beam could be projected on the side of the wafer, and the changes in the shadow produced on an array of photodetectors could be monitored. A number of other mechanisms will be apparent to those of skill in the art.

Figure 3:
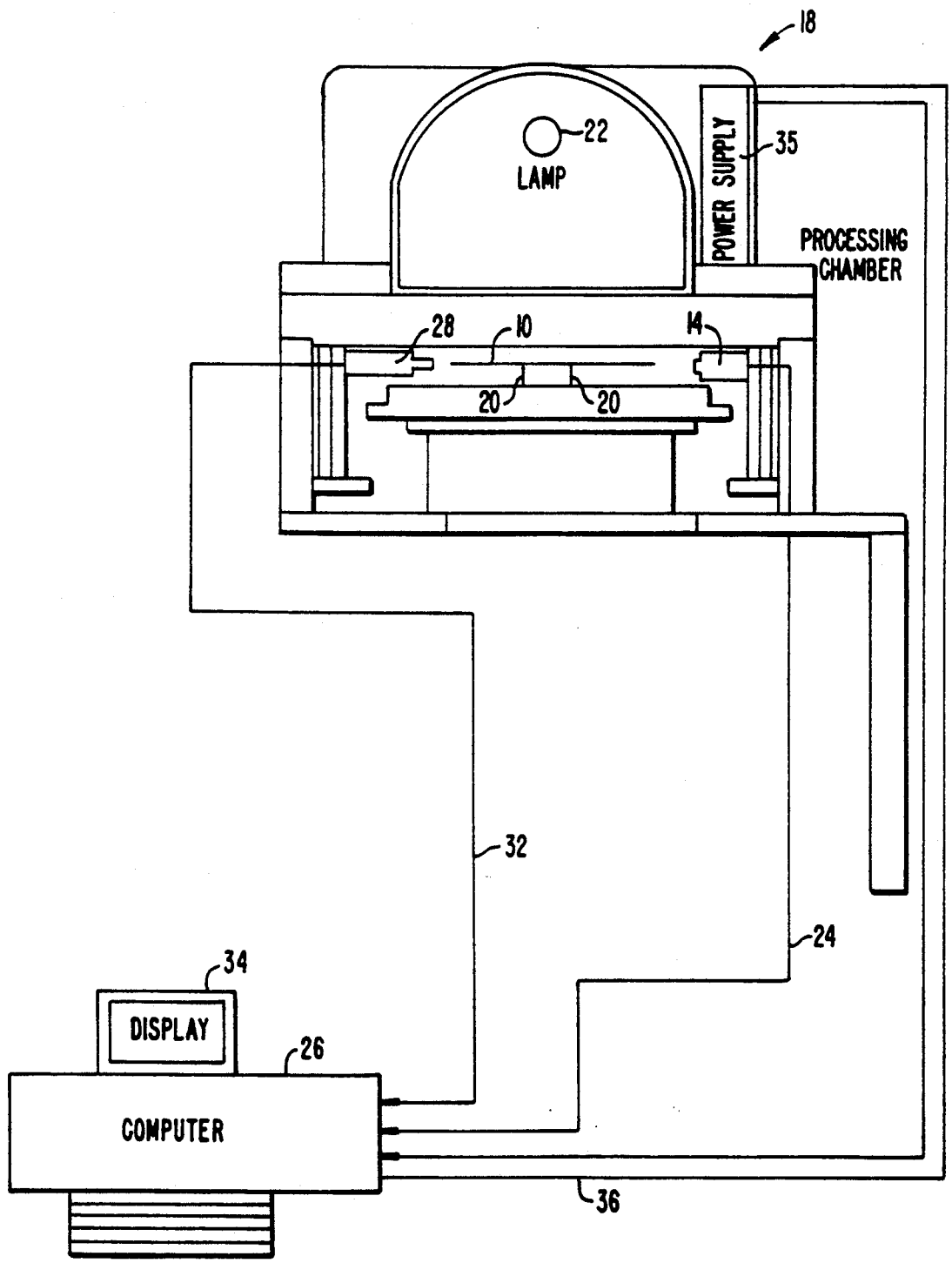
FIG. 3 is a diagram of a wafer heating chamber system using the present invention.

FIG. 3 shows an embodiment of a semiconductor heating chamber 18 using the present invention. Wafer 10 is mounted on a pair of supports 20 and is heated by an arc lamp 22. An auto-focus system 14 focuses on one edge of wafer 10, and sends a signal indicating the change in position over a line 24 to a computer 26. A second auto-focus system 28 is also shown on the other side of the wafer. Again, a signal line 32 provides the signal to computer 26. In operation, as the wafer is heated, it will expand and the change in dimension will be detected by auto-focus mechanisms 14 and 28. The signals provided on lines 24 and 32 to computer 26 will enable computer 26 to determine the change in diameter. The computer will then determine the change in temperature using the coefficient of thermal expansion for silicon as discussed above. The temperature can then be displayed on display 34 and also used as a control signal on line 36 to a power supply 35 in heating chamber 18 to control the amount of power applied to the heating lamp 22.

Figure 4:
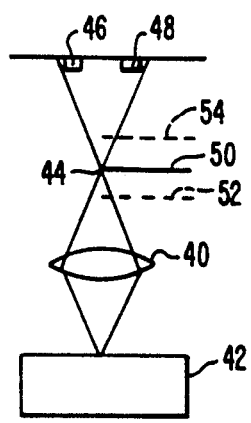
FIG. 4 is a diagram illustrating the auto-focus concept used in one embodiment of the present invention.

FIG. 4 illustrates the basic concept of the preferred auto-focusing mechanism for the present invention. The basic method is known as the Foucault knife edge test. A lens 40 focuses a beam onto a wafer 42. The return beam has a focus point 44 behind the lens. The beams converge at this point and then diverge to hit photodetectors 46 and 48. A knife edge or razor blade 50, inserted at the focus point, would remove the light equally from both photodetectors. However, if the knife edge was inserted at a point 52 from the right side, it can be seen that the beam to photodetector 46 will be blocked first. By measuring the signal from the photodetector, it can be determined that the knife edge needs to be moved closer to the photodetector to be at the focus point. If the knife edge moves to a position 54, the light to photodetector 48 will be blocked first. Thus, it could be seen that the knife edge has moved too far towards the photodetector and should be moved back towards the lens to reach the focus point. This knife edge test thus tells what direction and gives an indication of the distance the knife edge needs to be moved to be at the focus position. When the focus position changes, this indicates that the edge of wafer 42 has moved, putting the system out of focus by moving the focus point. Thus, an auto-focus condition can be quickly reached by moving the knife edge and measuring the distance it moved, and thereby determining how much the lens must be moved to keep the system in focus or how much the assembly (lens, knife edge and detectors) needs to be moved to maintain focus.

Figure 5:
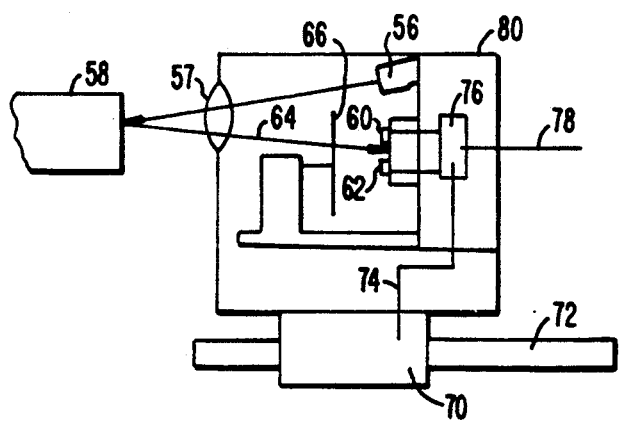
FIG. 5 is a diagram of an auto-focus system used in one embodiment of the present invention.
Figure 6:
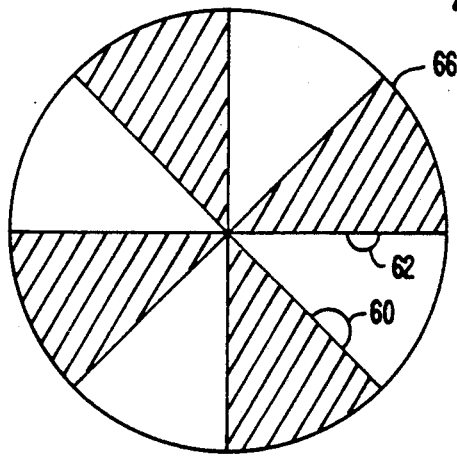
FIG. 6 is a diagram of the chopper wheel of the embodiment of FIG. 5.
Figure 7:
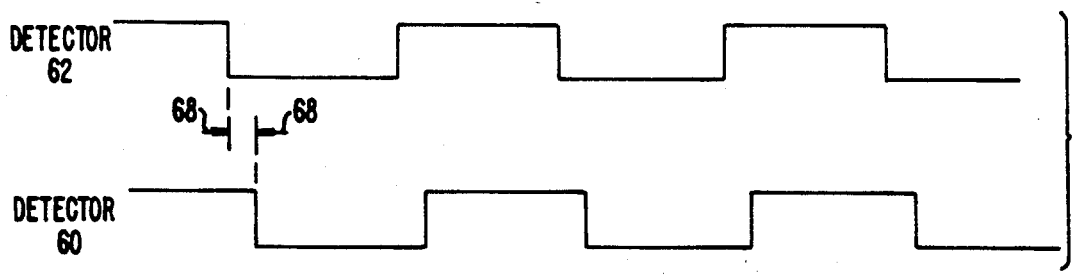
FIG. 7 is a timing diagram of the photodetector outputs of the embodiment of FIG. 5.

One problem with the basic knife edge mechanism shown in FIG. 4 is that it is susceptible to errors as a result of vibrations which can cause alignment problems. This is overcome with an improvement of the system shown in FIG. 5 using a chopper wheel. The concept of using a chopper wheel for the Foucault test is currently used in some conventional microscopes. A light source 56 reflects a beam off of a wafer 58 through a lens 57. A reflected beam 64 is then provided to a pair of detectors 60 and 62. The reflected light beam 64 first passes through a chopper wheel 66. The chopper wheel is shown in a front view in FIG. 6 partially blocking photodetectors 60 and 62. Because of the triangular shape of these sections of the chopper wheel, a movement of the focus point sideways due to vibration does not affect the output. The output of the photodetectors as the chopper wheel rotates is shown in FIG. 7. When the chopper wheel is at a position not at the focus point, the wheel will block the light for one detector at an earlier point in time than for the other detector, resulting in a phase difference indicated by arrows 68 in FIG. 7. The amount of this phase difference indicates the distance the chopper wheel needs to be moved to be at the focus point, and the sign of the phase difference indicates the direction of movement required.

Referring back to FIG. 5, the auto-focus assembly 80 has a motor 70 mounted on a bar or other carriage 72 which allows it to move forward and back to reach the focus position. A control signal on a line 74 is provided to the motor from a circuit 76. Circuit 76 receives signals from the two photodetectors, determines the phase difference, and provides an appropriate control signal to the motor. In addition, an output line 78 from the circuit provides a signal indicating the position of the auto-focus assembly at the focus point, which will correspond to the absolute position of the edge of wafer as it expands and contracts during heating and cooling.

Figure 8:
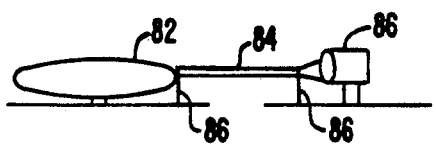
FIG. 8 is a diagram of an alternate embodiment of the system of FIG. 1 using a rod in contact with the edge of the wafer.

FIG. 8 shows an alternate method of measuring the expansion of the edge of a wafer 82 using a rod 84. Rod 84 is supported by a pair of flexure bearings 86. The flexure bearings, which are thin, springy sheets of metal in an appropriate mounting support the rod 84 against wafer 82, but do not produce any friction against wafer 82, allowing the rod to be moved by the expansion of wafer 82. This movement on the rod is thus proportional to the expansion of the wafer, and can be detected at the end of rod 84 by an autofocus system 88. This allows the optics in the autofocus system to be removed from the hot wafer.

As will be apparent to those of skill in the art, the present invention could be embodied in other specific forms without departing from the spirit or essential characteristics of the invention. For example, other particular mechanisms could be used to measure the expansion of the wafer as noted above. In addition, the temperature of objects other than wafers can be monitored with the present invention. Accordingly, the disclosure of the preferred embodiment of the invention is intended to be illustrative, but not limiting, of the scope of the invention which is set forth in the following claims:

What is claimed is:

1. An apparatus for determining the temperature of a semiconductor wafer during processing comprising:
   a light source directing a beam of light at an edge of said semiconductor wafer:
   a chopper wheel mounted to rotate through a reflected beam of said beam of light off said semiconductor wafer;
   first and second photodetectors mounted to receive said reflected beam as chopped by said chopper wheel;
   processing means, coupled to said first and second photodetectors, for determining a phase difference between first and second electrical signals from said first and second photodetectors;
   means for moving said chopper wheel relative to said semiconductor wafer in a direction corresponding to the sign of said phase difference until said phase difference is eliminated;
   means for measuring a distance said chopper wheel is moved;
   processing means for applying said distance to a predetermined coefficient of thermal expansion for said semiconductor wafer to produce a signal indicating the temperature of said semiconductor wafer.

2. A method for determining the relative temperature of a semiconductor wafer during heat treatment comprising the steps of:
   measuring the physical change in a dimension of said semiconductor wafer by reflecting a light beam off an edge of said semiconductor wafer and detecting the focus position of a reflected beam, said detecting step including
      rotating a chopper wheel through said reflected beam,
      generating first and second electrical signals from two photodetectors receiving said reflected beam as chopped by said chopper wheel,
      determining a phase difference between said first and second electrical signals,
      moving said chopper wheel relative to said semiconductor wafer in a direction corresponding to the sign of said phase difference until said phase difference is eliminated, and
      measuring the movement of said chopper wheel;
   applying said measured physical change to a predetermined coefficient of thermal expansion for said semiconductor wafer.

3. The method of claim 2 wherein said chopper wheel is moved by moving an assembly containing said chopper wheel and said two photodetectors.

* * * * *